United States Patent [19]

Comer et al.

[11] 4,250,695
[45] Feb. 17, 1981

[54] POWERED LAWN CARE AND CULTIVATING IMPLEMENT

[75] Inventors: Robert C. Comer, Hopkins; Henry B. Tillotson, Minneapolis, both of Minn.

[73] Assignee: The Toro Company, Minneapolis, Minn.

[21] Appl. No.: 943,207

[22] Filed: Sep. 18, 1978

[51] Int. Cl.³ .......................................... A01D 57/12
[52] U.S. Cl. ...................................... 56/12.7; 56/17.2
[58] Field of Search ...................... 56/12.7, 13.2, 14.4, 56/17.2, 16.1, 364

[56] References Cited

U.S. PATENT DOCUMENTS

| | | | |
|---|---|---|---|
| 506,677 | 10/1893 | Drake | 56/364 |
| 2,481,364 | 9/1949 | Strong | 56/12.7 |
| 2,505,576 | 4/1950 | Reitan | 56/13.2 |
| 2,631,418 | 3/1953 | Ronning | 55/118 |
| 2,916,753 | 12/1959 | Redpath et al. | 15/84 |
| 2,938,326 | 5/1960 | Lundell | 56/12.7 |
| 2,977,740 | 4/1961 | King | 56/17.2 |
| 3,018,602 | 1/1962 | Diesterweg | 56/12.7 |
| 3,184,777 | 5/1965 | Nurden | 56/13.2 |
| 3,217,474 | 11/1965 | Neilson | 56/12.7 |
| 3,229,320 | 1/1966 | Cymara | 56/13.2 |
| 3,693,335 | 9/1972 | Mathews | 56/12.7 |
| 3,802,173 | 4/1974 | Opitz | 56/17.2 |
| 4,028,868 | 6/1977 | Zehrung, Jr. | 56/12.7 |
| 4,068,455 | 1/1978 | Zehrung, Jr. | 56/16.1 |
| 4,077,190 | 3/1978 | Crites | 56/12.7 |
| 4,089,114 | 5/1978 | Doolittle et al. | 56/12.7 |
| 4,126,990 | 11/1978 | Fisher et al. | 56/12.7 |

OTHER PUBLICATIONS

Toro Rake-O-Vac Parts Catalog, Copyright 1974.

Primary Examiner—Paul J. Hirsch
Attorney, Agent, or Firm—Merchant, Gould, Smith, Edell, Welter & Schmidt

[57] ABSTRACT

An improved powered lawn care implement which can accomplish both reducing of debris and removal of lawn thatch. The implement includes a generally horizontally mounted elongated processing element which carries a plurality of generally radially extending resilient filaments. The implement can be made so that the height of the processing element above the ground surface which is to be worked by the implement can be varied. Free ends of the filaments can thereby be made to engage either debris at the lawn surface or dead vegetative matter located near the base of grass filaments growing in a lawn.

9 Claims, 5 Drawing Figures

POWERED LAWN CARE AND CULTIVATING IMPLEMENT

BACKGROUND OF THE INVENTION

The invention of this application relates to power lawn implements and more specifically to a device for reducing, i.e. pulverizing and comminuting, debris such as leaves and cut grass, commonly found on lawns, to reduce the size of such debris so that it may be reposited on the lawn surface between, rather than atop, the growing grass filaments. It also relates to a device for raking lawns to lift and separate material commonly called "thatch," i.e. matted dead grass and debris which collect on a lawn surface at the ground level, from growing grass filaments. Debris reducing implements improve the appearance of lawns by particlizing large pieces of debris lying atop the grass filaments and redepositing the particlized matter back into the lawn at the ground level where the matter may decay and provide fertilization of the lawn. Power-raking implements promote healthful growth of the lawn by removing the thatch. If thatch is not periodically removed, it may create a barrier through which air and water may not easily penetrate to the soil and also may provide an environment which encourages harmful fungus growth.

The most common type of lawn debris reducing implement in use today for residential lawn application is of the walk-behind rotary type. Typically, these walk-behind rotary implements have one or more blades configured to accomplish the pulverizing and comminuting function. The blade or blades are commonly mounted on a shaft attached to the implement proper, the shaft oriented generally perpendicular to the plane of the ground.

Such implements are not typically suited to provide the dual function of removing thatch and reducing debris, and will often only marginally perform the debris reducing task. Lawn debris reducing blade numbers and arrangements are frequently inadequate to accomplish the desired particlization of the debris. A horizontal orientation of the blade may also decrease the amount of time during which debris is exposed to the reducing process and allow debris movement in the direction of the blade so that only a small velocity differential exists between the blade and debris. Minimizing the velocity differential precludes efficient particlizing. Furthermore, rather than directing the particlized debris back toward the lawn and forcing it down into the grass growing thereon, the debris is, rather, allowed to merely settle in the upper extremities of the grass. Only minimal protection and fertilization is thus realized.

The invention of the present application may, in certain embodiments, function both as a debris reducing implement and a power rake for removing thatch. Because of its debris processing element structure and orientation, it is capable of converting debris to a very fine particulate size and redepositing the reduced debris well beneath the upper extremities of the grass.

SUMMARY

The present invention is an improved device capable of use for debris reducing and, in some embodiments, power raking of a lawn to remove thatch. It includes a carriage or frame which may, in some cases, carry rotatably mounted wheels to allow movement of the carriage over the lawn at a controlled height.

A debris processing element is mounted to the carriage for rotary movement about a substantially horizontal axis. The element includes a plurality of flexible filament members which extend radially from the axis during rotary movement of the element. The filaments are spaced along the element axis. Reduction of debris is accomplished by repetitive slashing contact between these filaments and debris on the ground as the implement is moved over the ground surface.

The debris processing element is partially enclosed within a housing which, in some embodiments, includes an arcuate top wall with vertical extensions at the front and rear of the top wall defining the edges of the housing. In certain embodiments, the housing may extend generally parallel to the element axis for substantially the entire length of the element. The implement also includes a power source for providing rotary drive to the processing element.

Filament orientation and spacing can be varied from one embodiment to another depending upon the particular conditions under which the implement is to be used. A preferred structure for the reducing element includes filaments of equal length mounted along the rotational axis at equal intervals, with adjacent filaments mounted at 90 degrees which respect to one another in order to maximize engagement of filaments with debris and distribute the power load.

As the implement of the present invention is moved over a ground surface at a controlled height, the filaments work against the lawn surface to reduce debris thereon to a fine particulate matter. If raking to remove thatch is desired, the implement is lowered to depress the surface contact point to the thatch level where the implement may lift and separate thatch from the growing grass plants. In certain embodiments, the implement may be used for light tilling of soil or cultivation if soil conditions are appropriate. Other features and advantages of the invention will become apparent upon reference to the accompanying drawings, detailed description of the preferred embodiment, and claims.

DESCRIPTION OF THE PREFERRED EMBODIMENT

Figure 1:
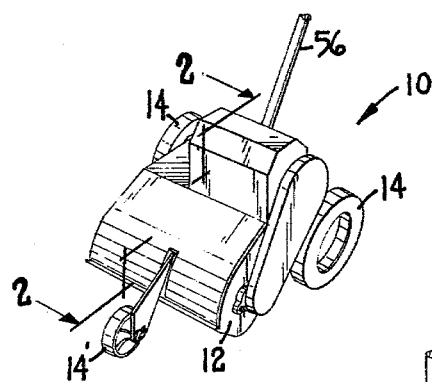
FIG. 1 is a view in perspective of a powered lawn care implement contructed according to one embodiment of the present invention.

Referring to the figures, wherein like reference numerals denote like elements, FIG. 1 generally shows a power lawn care implement 10 which includes a carriage or frame 12 to which are rotatably mounted a plurality of ground engaging wheels 14 and 14'. In the embodiment shown, wheels 14, 14' are mounted to define generally parallel planes of rotation to allow easy movement of the implement 10 over the ground. Two larger rear wheels 14 are mounted for rotation about a common axis on axle 16. A third wheel 14' is adjustably mounted at the front of the implement 10 to provide additional stability needed in some modes of use.

The preferred embodiment contemplates use of a debris reducing or raking element generally designated 17 which includes a plurality of resilient filaments 18 mounted for rotation about a generally horizontal axis. When so mounted, the filaments 18 extend generally radially from, and are spaced along, this axis. Although mounting and orientation of the filaments 18 can be accomplished in a number of ways, in the embodiment shown, they are carried by and extend radially outward from a circularly cylindrical shaft 20 whose longitudinal axis corresponds with the debris reducing element axis of rotation.

Filaments 18 are preferably constructed of a resinated nylon material or a wire-core material coated with nylon. Individual filaments 18 are highly flexible in nature to permit contact with rigid objects on a ground surface without damage to the debris reducing element 17. However, when element 17 is rotatably driven, filaments 18 extend radially outward from the rotational axis of the element 17 due to centrifugal force acting on and along their length. Filaments 18 are typically of a cross-sectional diameter between 0.040 and 0.125 inches.

Figure 5:
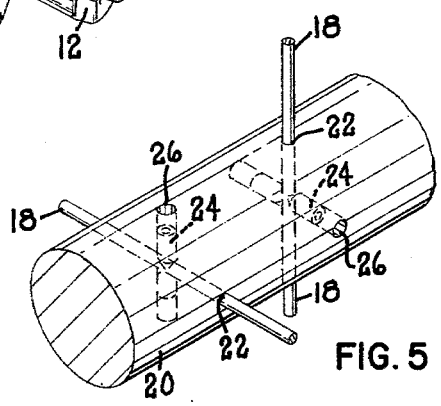
FIG. 5 is a fragmentary view in perspective illustrating a means for mounting the filaments to a rotary shaft of the present invention.

To facilitate construction of the debris reducing element, a pair of filaments spaced 180 degrees may be formed from a unitary piece of nylon-filament material as shown in FIG. 5. This material is fed through bores 22 in shaft 20 having a diameter sized similar to that of nylon filament selected. The seqments of filament material can be fed through bores 22 so that equal portions of each segment extend on either side of shaft 20. Each segment of filament material is then secured to shaft 20 by means of set screws 24 in threaded crossbores 26 provided for this purpose.

Although FIG. 5 illustrates one specific construction of element 17, it will be apparent to those skilled in the art that many alternative mounting constructions might be used, and that not only is the set screw method of connection of filaments not essential, but an alternative filament supporting means such as a lightweight drum member might be used instead of the shaft which is shown in the figures.

Although not shown in the Figures, filaments 18 could be permanently mounted to the shaft 20 so that together they form a unitarily constructed reducing element. Such a structure would facilitate filament replacement since the shaft itself could be replaced.

In the preferred embodiment, filaments 18 are laterally spaced at equal intervals, and individual filaments extend outward from the rotational axis at equal length. When filaments 18 are made to equal lengths, rotation of filaments 18 with a shaft 20 about a longitudinal axis thereof will cause the free ends 28 of the filaments 18 to define a form generally cylindrical in shape.

In order to facilitate a more even and continuous engagement of free ends 28 with debris lying on the lawn or thatch in the lawn on which implement 10 is used, axially adjacent filaments 18 may be angularly displaced about the rotational axis of element 17. In the embodiment shown in FIG. 5, adjacent filaments 18 are transversely directed, i.e., angularly displaced 90° from one another.

Figure 2:
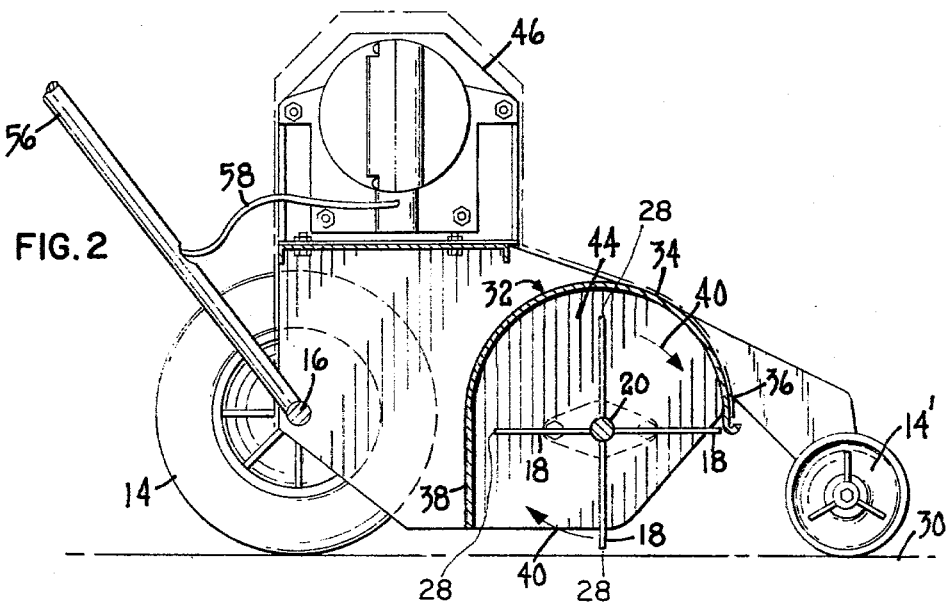
FIG. 2 is an enlarged sectional view as seen from the line 2—2 of FIG. 1.

A shroud or housing 32 is mounted to frame 12 and partially encloses shaft 20 and filaments 18 mounted thereto. Shroud 32 functions to shield debris reducing element 17, to provide a surface which can impose an abrasive force upon reduced particles thereby supplementing reduction, and to channel or direct debris vertically downward for redeposit on the ground surface. Shroud 32 has a top wall 34 which may extend arcuately to enclose element 17 substantially through the upper two quadrants of its rotation. As shown in FIG. 2, top wall 34 is preferably a semi-circular cylindrical shape and generally follows the cylinder defined by rotation of free ends 28 of filaments 18.

Shroud 32 also has front and rear generally vertically extending walls, 36 and 38 respectively, which are substantially planar extensions of top wall 34 taken along tangents to top wall 34 at its front and rear edges. Front wall 36 extends downward from top wall 34 only a short distance to facilitate debris entry and contact, while rear wall 38 is of a length so that it extends to the bottom of carriage 12. Because of the direction of rotation of the shaft 20 and the filaments 18 thereon, shown by arrows 40, debris on the ground is worked against the ground surface, then impelled toward the rear of the implement, then upward and forward to be redeposited by element 17. Rear wall 38 thus serves to shield the user from debris and redirect that debris into an elongated hemicylindrical chamber 44, formed by shroud 32, where particulate debris flow is rechanneled back down toward the lawn.

Front wall 36 functions to direct debris particlized by filaments 18 downward towards the lawn rather than ejecting it horizontally in front the device. This aids in redepositing reduced debris close to the roots of grass plants rather than in the upper extremities of the grass filaments.

In order for shroud 32 to be fully effective in accomplishing its designed purposes, it is necessary that it extends substantially throughout the portion of element 17 which carries filaments 18 at a substantially uniform spacing from the free ends of the filaments. In the preferred embodiment disclosed, shroud 32 extends generally parallel to the axis about which shaft 20 and filaments 18 rotate, since the filaments are of equal length.

Figure 3:
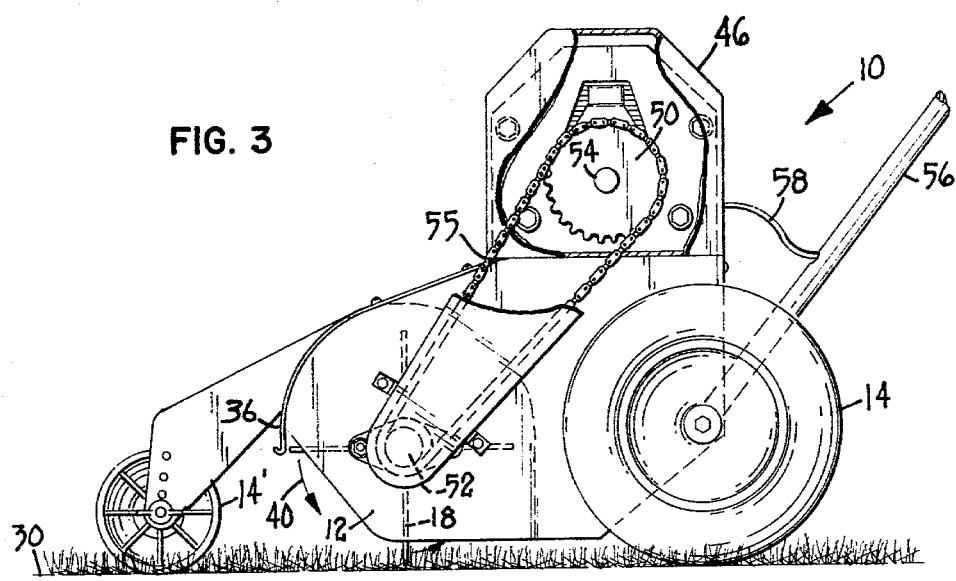
FIG. 3 is a side elevational view thereof as seen from the side shown in FIG. 1, portions thereof being broken away and shown in section.
Figure 4:
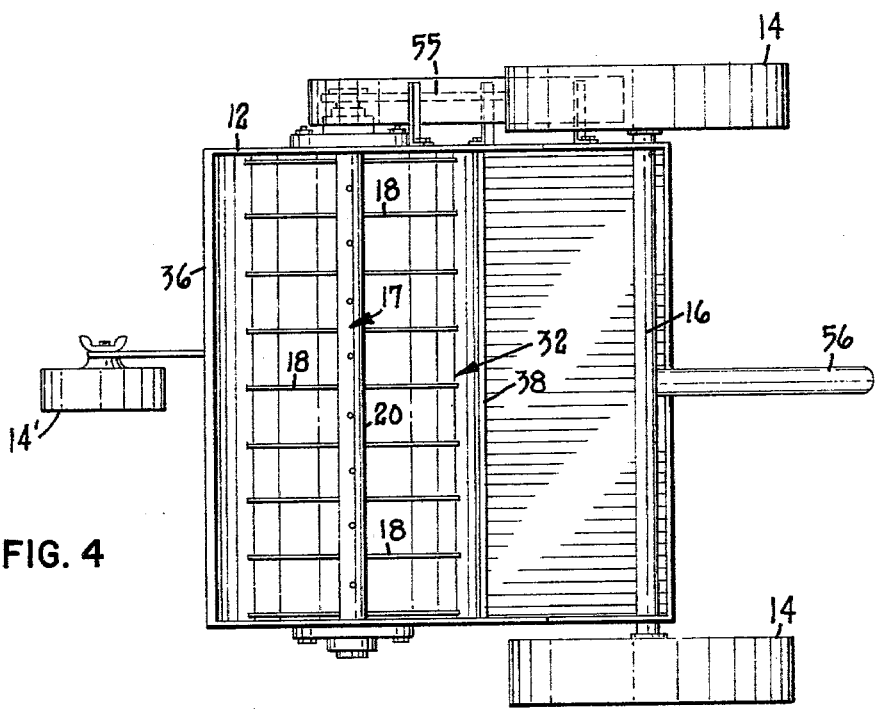
FIG. 4 is a bottom plan view thereof.

Element 17 is rotationally driven by movement imparted to shaft 20 by suitable power means, such as an electric motor 46 mounted on carriage 12. Rotational movement is transferred from motor 46 to shaft 20 by a suitable transmission means, one possible configuration of which is shown in FIG. 3. In that figure, a chain drive transmission is shown with sprockets 50 and 52, one mounted to motor shaft 54 the other mounted to shaft 20. These sprockets are interconnected by means of an endless chain 55.

While not shown in the figures, the invention may incorporate a power drive to propel the unit over the ground to be worked. Although the device may be towed, the embodiment shown includes a handle 56 as commonly used with conventional lawn mowers or other lawn care implements for operator control from the rear of the implement. When the motor 46 for generating rotational motion is electric, handle 56 may be tubular to serve as a conduit for a power extension cord 58.

In one specific embodiment of the present invention which has been constructed, resinated nylon filaments of 0.080 inches cross sectional diameter were affixed at one inch spacing along the axis of shaft 20 for a 12 inch working length, with adjacent filaments being oriented transversely of one another. Shaft 20 was of one inch diameter, and the radial extent of filaments 18 was approximately 3 inches. The element so constructed was rotatably driven at a velocity of approximately 10,000 RPM, and achieved a free-end-tip speed of approximately 15,700 feet per minute.

During use of the present invention, it has been demonstated that the implement functions, at a height setting in FIG. 3, very effectively as a leaf and other vegetative debris reducer by particlizing debris so finely that the matter may be readily redeposited into a lawn surface without need for pick up and disposal of leaves or other debris. Alternatively, by setting the front wheel 14' at a setting which lowers the position of element 17 with respect to the ground surface, the unit has been found to function effectively to rake and remove thatch from residential lawn surfaces with a power consumption requirement significantly lower than conventional power rakes. It is also possible in certain soil circumstances to use the device of the present invention as a tiller or cultivator with an appropriate height setting.

Although the debris reducing and raking implement 10 disclosed herein has been described in terms of specific embodiments and preferred constructions, it will of course be understood that the invention is defined in the appended claims, and many alternatives and modifications within the spirit and scope of the invention as defined by these claims will occur to those of skill in the art.

What is claimed is:

1. A debris reduction, lawn raking, and cultivating device, comprising:
    a frame;
    a plurality of ground engaging wheels rotatably mounted on said frame, said wheels defining generally parallel planes of rotation;
    a generally horizontal shaft rotatably mounted to said frame, said shaft having an axis generally transverse to the planes defined by said wheels;
    a plurality of filament members, each having a cross-sectional diameter of between 0.040 and 0.125 inches and at least partially composed of nylon, said filaments being generally equal in length, and spaced at equal intervals axially along said shaft with axially adjacent filaments angularly spaced from one another, said filaments extending from said shaft so that equal portions terminating in free ends extend radially from said shaft upon rotation of said shaft;
    a housing mounted to said frame extending the length of, and generally parallel to, said shaft, said housing having an arcuate portion above said shaft radially spaced from said free ends of said portions of said filaments, and front and rear generally vertical planar extensions from said arcuate portion radially spaced from said free ends, said front generally vertical planar extension being shorter in length than said rear generally vertical planar extension;
    a motor generating rotational movement;
    transmission means conveying the rotational motion generated by said motor to said shaft; and
    handle means for transmitting directional control to said device during its movement over a ground surface.

2. The device of claim 1 further comprising height adjusting means associated with said frame for varying the proximity of said free ends of said filaments to a ground surface over which the device is passed.

3. The device of claim 1 wherein said filaments are laterally spaced from one another along said axis at intervals greater than twice the filament cross sectional diameter.

4. The device of claim 1 wherein axially adjacent filaments are mounted to said shaft so that they radiate outward from said rotational axis transversely to one another.

5. The device of claim 1 wherein said filaments have free ends, and the free ends, when said filaments rotate about said axis, define a form generally circularly cylindrical in shape.

6. The device of claim 1 wherein said filaments extend radially from said shaft a distance so that said free ends can engage the ground surface.

7. The device of claim 1 wherein said rear wall has a lower edge disposed proximate the ground surface to channel debris and raked thatch upwardly within said housing.

8. The device of claim 1 wherein the filament members are constructed of a resinated nylon material.

9. The device of claim 1 wherein the filament members are constructed of a coated wire core material.

* * * * *